United States Patent [19]

Hidaka et al.

[11] Patent Number: 5,363,488
[45] Date of Patent: Nov. 8, 1994

[54] INPUT/OUTPUT COMMAND ISSUING CONTROL SYSTEM IN DATA PROCESSING SYSTEM

[75] Inventors: Yuji Hidaka; Makoto Kimura, both of Kawasaki, Japan

[73] Assignee: Fujitsu Limited, Kawasaki, Japan

[21] Appl. No.: 859,468

[22] PCT Filed: Oct. 2, 1991

[86] PCT No.: PCT/JP91/01325
§ 371 Date: Jun. 2, 1992
§ 102(e) Date: Jun. 2, 1992

[87] PCT Pub. No.: WO92/06057
PCT Pub. Date: Apr. 16, 1992

[30] Foreign Application Priority Data

Oct. 3, 1990 [JP] Japan ............... 2-265885

[51] Int. Cl.⁵ .............................. G06F 13/00
[52] U.S. Cl. ................................. 395/275
[58] Field of Search ............... 395/200, 275

[56] References Cited

U.S. PATENT DOCUMENTS 5,220,653 6/1993 Miro ........................ 395/275

FOREIGN PATENT DOCUMENTS 61-288232 12/1986 Japan .

Primary Examiner—Robert L. Richardson
Attorney, Agent, or Firm—Staas & Halsey

[57] ABSTRACT

An I/O command issuing control system is applied to a data processing system including a processor module provided with a CPU and an adaptor module which is connected to the processor module via a system bus. The adaptor module controls an I/O device on the basis of an I/O command from the processor module. The CPU carries out separate processes after issuing an I/O command and the adaptor module returns a result of a process, which result is based on the I/O command from the processor module. An interrupt request is made, when a process in the adaptor module is unsuccessful, to the CPU inside the processor module in order to provide the CPU with the process result of the adaptor module.

11 Claims, 10 Drawing Sheets

FIG. 2
PRIOR ART

51 PROCESSOR MODULE (PM)

| CPU | MPU BUS | BUS CONTROLLER |

52 SYSTEM BUS

53 ADP

54 I/O COMMAND

ISSUING OF I/O COMMAND → TRANSMISSION OF I/O COMMAND BUS COMMAND

WAIT STATE

RETURNING OF RESPONSE SIGNAL

56 ACTIVATION RESULT
- OK → 57 NEXT COMMAND
- NOT OK → 58 ACTIVATION FAILURE PROCESS

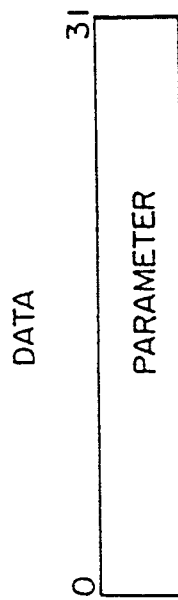
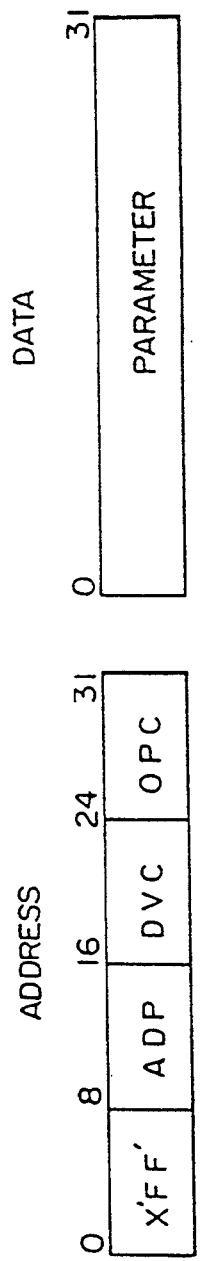
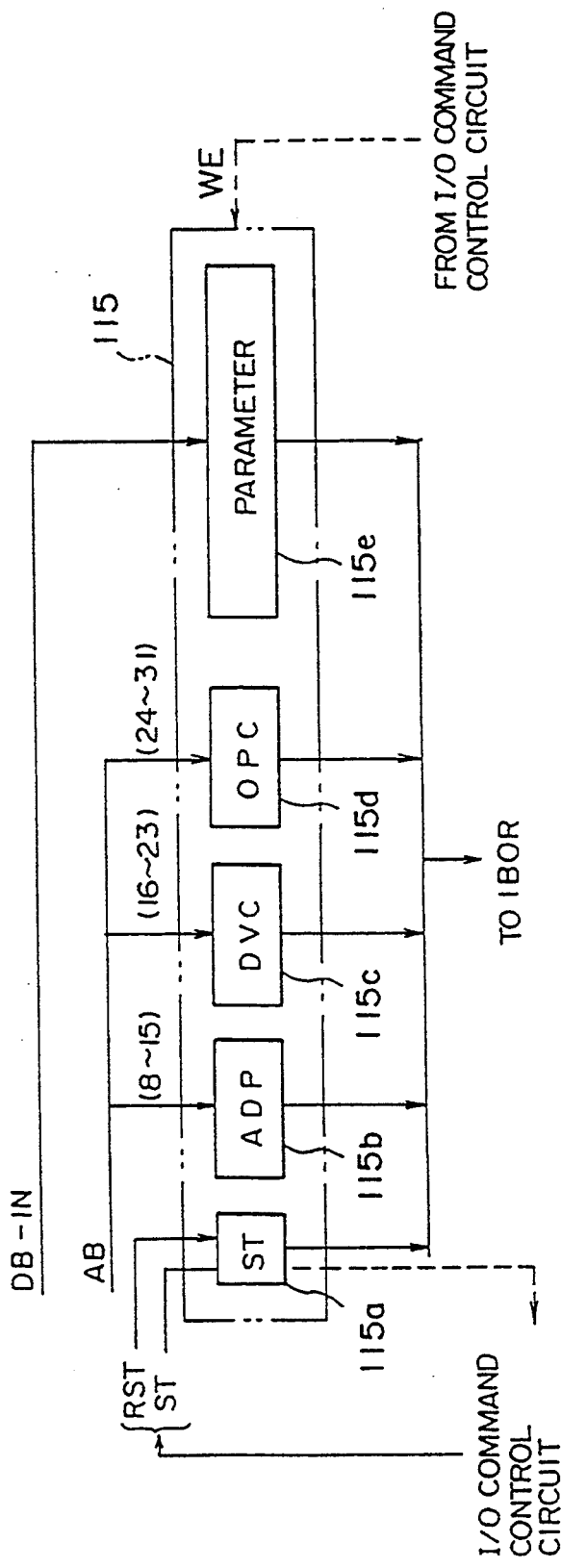

FIG. 10
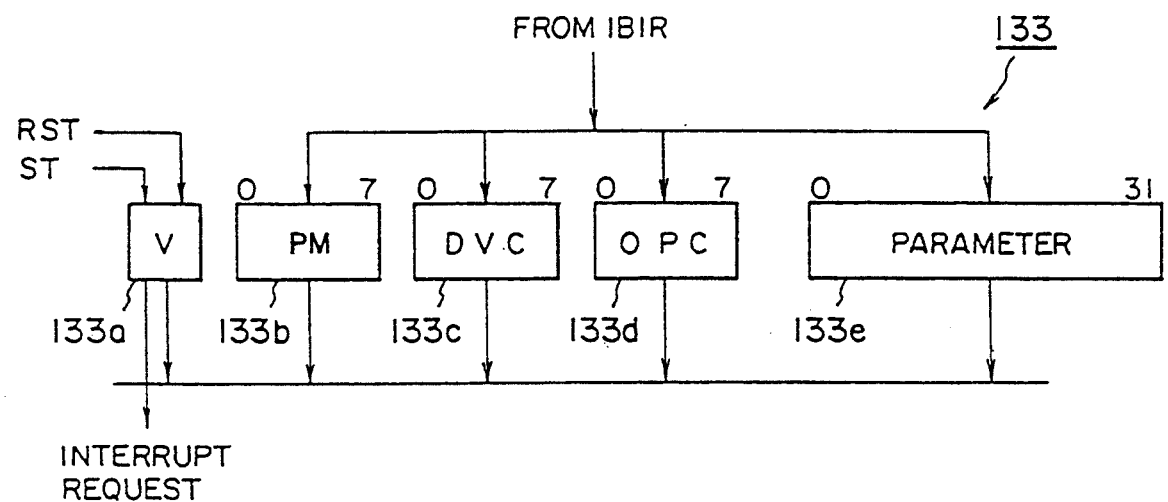
FIG. 11
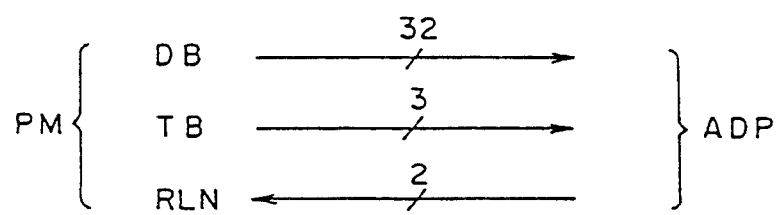
FIG. 12

INPUT/OUTPUT COMMAND ISSUING CONTROL SYSTEM IN DATA PROCESSING SYSTEM

FIELD OF THE INVENTION

The present invention relates to an I/O command issuing control system in a data processing system, and more particularly to an I/O command issuing control system in a data processing system that allows efficient processing following issuance of an I/O command.

BACKGROUND ART

FIG. 1 is a block diagram illustrating a basic principle of a data processing system. Referring to FIG. 1, this data processing system comprises a processor module 30, adaptor modules (ADP) 42 and 42', and a system bus 41 connecting the processor module 40 to each of adaptor modules 42 and 42'. I/O devices (DV) 43 and 44, and 43' and 44', are respectively connected to the adaptor modules 42 and I/O devices 43, 44, 43' and 44' are auxiliary storages (such as disk drives). The processor module controls the I/O devices 43, 44, 43' and 44' via the system bus 41 and the adaptor modules 42 and 42'. Inside the processor module 40, a CPU 45, a memory module (MM) 46, and a bus controller 48 are interconnected via an internal bus (MPU bus) 47. The bus controller 48 generates a bus command used for transferring, to the adaptor module 42 (42'), via the system bus 41, an I/O command issued from the CPU 45. An I/O command on the basis of this bus command is transferred to the adaptor module 42 (42'). The bus controller 48 also notifies the CPU 45 whether or not the I/O command, transmitted from the adaptor module 42 (42') via the system bus 41, was successful in activating the I/O devices 43 and 44.

FIG. 2 is a flowchart illustrating a conventional I/O command issuing control process for a data processing system as that shown in FIG. 1.

Referring to FIG. 2, this I/O command issuing control process is divided into separate processes in a processor module 51, a system bus 52, and an adaptor module 53 (hereinafter simply called an adaptor). The processor module 51, the system bus 52 and the adaptor 53 are connected in the same manner as shown in FIG. 1 (although connections are not shown in FIG. 2).

A CPU in the processor module 51 issues an I/O command 54. This I/O command is transferred to a bus controller via an MPU bus. The bus controller modifies the I/O command so that the command is suitable for the system bus, and the modified I/O command is supplied to the adaptor (ADP) via the system bus 52. The adaptor (ADP) 53 that received the I/O command from the CPU notifies the bus controller of the processor module 51 whether or not control of an I/O device on the basis of the I/O command is possible, notification taking place by means of a response signal on the system bus 52. After receiving the response signal from the adaptor 53, the bus controller submits the response signal to the CPU.

After issuing the I/O command 54, the CPU of the processor module 51 waits for the response signal resulting from the I/O command 54 to be returned from the adaptor. When the CPU receives the response signal from the adaptor the CPU carries out an activation result determination 56. When it is determined in this activation result determination 56 that an I/O device has been activated, the CPU carries out a process 57 of issuing a next command. When it is determined that an I/O device has not been activated, a specified activation failure process 58 (including a reactivation process) is carried out.

In a conventional I/O command issuing control process like the above, after issuing an I/O command, the CPU in the processor module holds a process of issuing a next command and waits for a response signal to be reported from an adaptor. Due to a comparative largeness of scale of a system bus, and to other factors, it takes a relatively long time to transmit an I/O command from a processor module to an adaptor via the system bus, and to return a response signal to the processor module via the system bus. This waiting time has not been an obvious disadvantage as far as the CPU of low processing speed is concerned. However, with increased performance of CPUs in recent years and the increased processing speed of CPUs, the effect of the waiting time described above on the processing efficiency of a CPU has become significant. That is, the waiting time is now a cause for lower-than-possible efficiency of entire data processing systems.

DISCLOSURE OF THE INVENTION

A general object of the present invention is to provide a novel and useful I/O command issuing control system in a data processing system, in which control system the aforementioned disadvantage is eliminated.

A more specific object of the present invention is to provide an I/O command issuing control system in a data processing system, wherein a CPU is allowed to execute separate processes even when the CPU does not receive an activation result signal from an adaptor module after issuing an I/O command.

The above object of the present invention can be achieved by an I/O command issuing control system which carries out, in a data processing system comprising the first module having a processing unit capable of processing multiple tasks including an issuing of an I/O command and comprising the second module which is connected to the first module via a system bus and which controls, on the basis of the I/O command issued from the first module via the system bus, I/O devices, a process control on an I/O command issued from the processing unit of the first module; whereby the processing unit of the first module, after issuing the I/O command, continues executing other processes, wherein the processing unit of the first module comprises an I/O command retaining means for retaining an I/O command issued from the processing unit and comprises a transferring means for transferring an I/O command retained in the I/O command retaining means to the second module via the system bus, wherein the second module comprises a response means for giving a response, about a result of an execution resulting from the I/O command, to the first module via the system bus, and wherein the first module further comprises a determination means for determining, on the basis of result of the execution supplied from the response means of the second module, whether a process in the second module resulting from the I/O command was successful or not, and comprises an interrupt request means for requesting, When the determination means makes a determination that the process in the second module was unsuccessful, an interrupt in order to provide the processing unit, which is executing other processes after issuing the I/O command, with the execution result in the second module.

Other objects, features and effects of the present invention will be apparent from the following description which is given in combination with the drawings.

BRIEF DESCRIPTION OF THE DRAWINGS

FIG. 2 is a flowchart illustrating a conventional I/O command issuing process.

FIGS. 8A and 8B are diagrams of a configuration of an I/O command issued from a CPU.

FIG. 9 is a block diagram illustrating a configuration of an IOPR register in FIG. 6.

FIG. 10 is a block diagram illustrating a configuration of an IOINST register in FIG. 6.

FIG. 11 is a diagram illustrating a format of an I/O command bus command.

FIG. 12 is a diagram illustrating a configuration of a bus signal at the time an I/O command is issued.

BEST MODE OF CARRYING OUT THE INVENTION

A description of the present invention will be given by referring to FIGS. 3 and 4.

Figure 1:
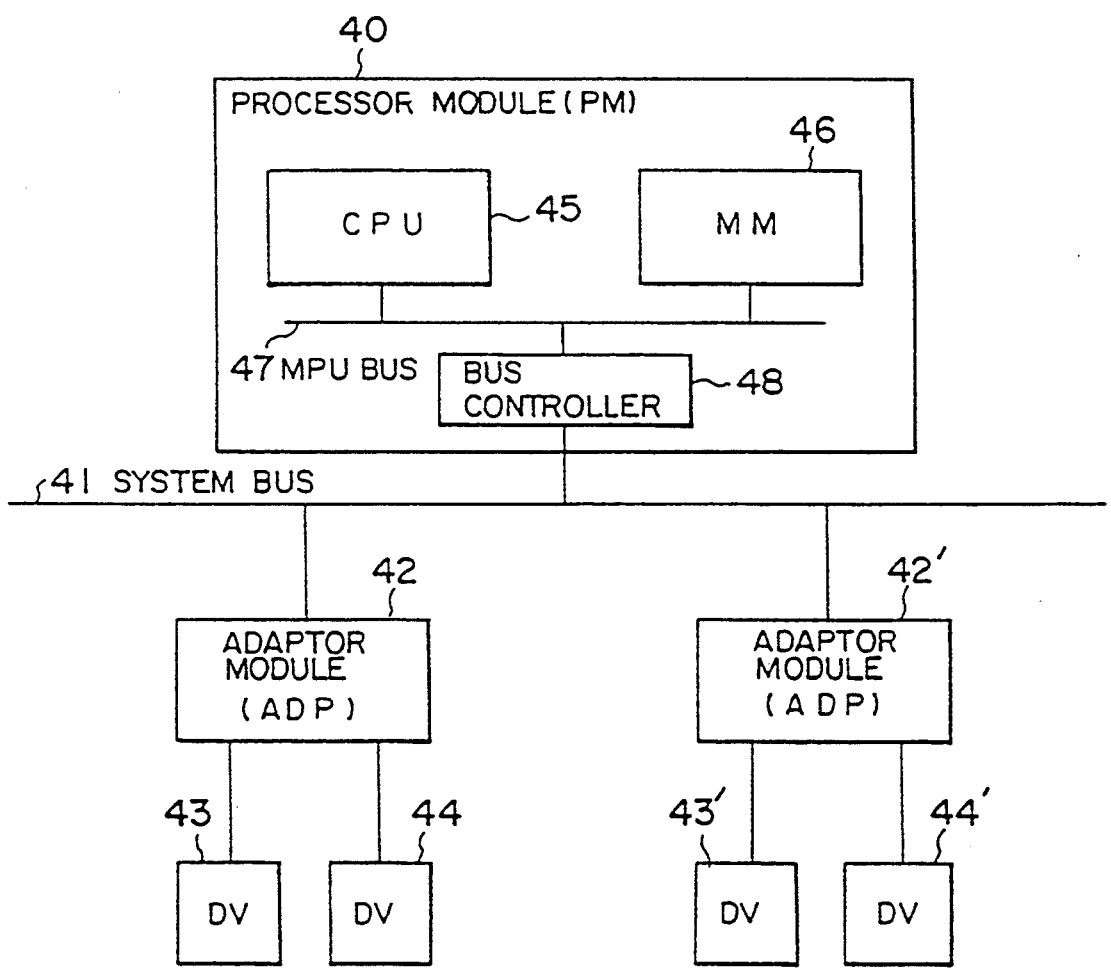
FIG. 1 is a block diagram illustrating a basic configuration of a conventional data processing system.
Figure 3:
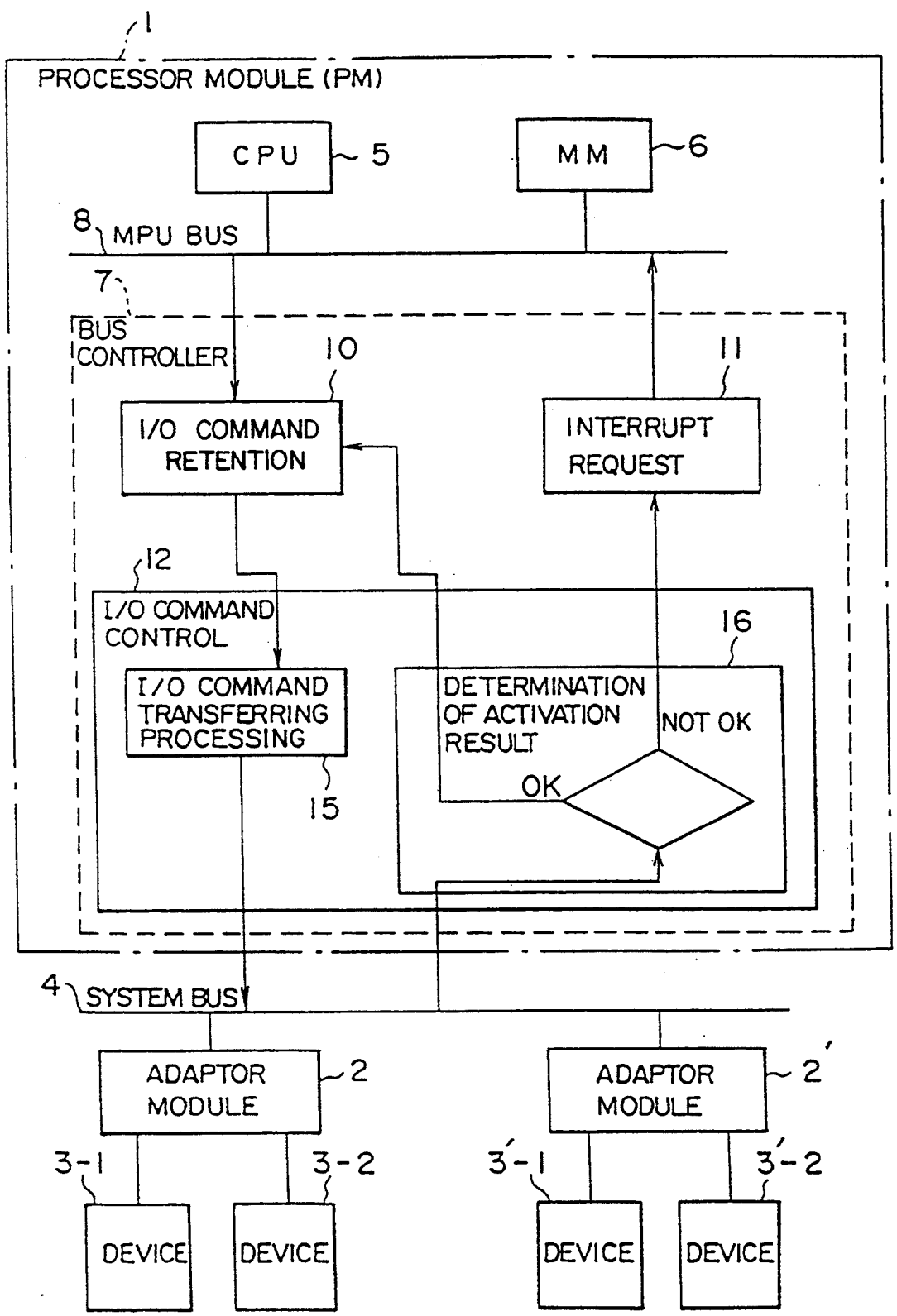
FIG. 3 is a block diagram illustrating a principle of an I/O issuing system of the present invention.
Figure 4:
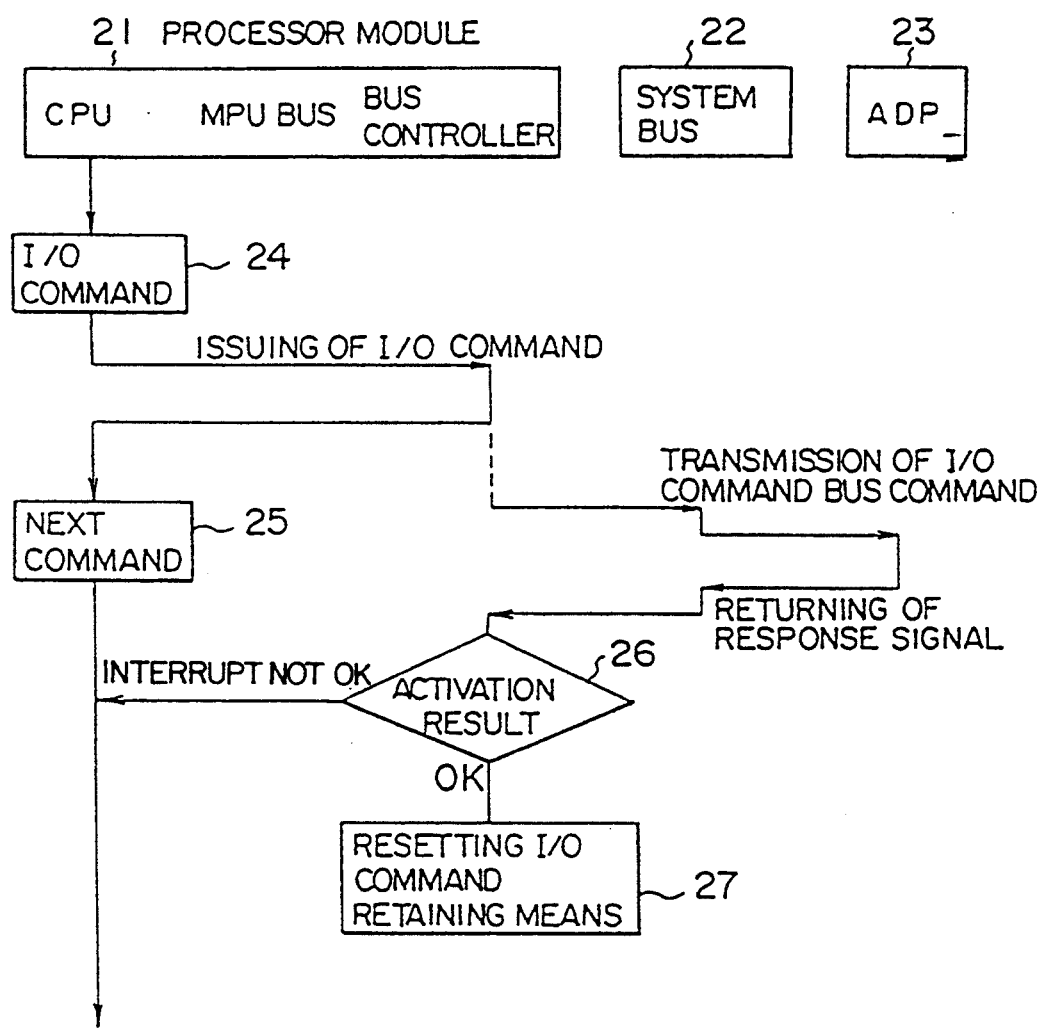
FIG. 4 is a block diagram illustrating a principle of a processin an I/O issuing system of the present invention.

Referring to FIG. 3, a data processing system comprises a processor module 1 and adaptor modules 2 and 2', and the processor module 1 and the adaptor modules 2 and 2' are connected by a system bus 4. The processor module 1 comprises a CPU 5, a memory module (MM) 6 and a bus controller 7, which are interconnected by a MPU bus 8. The adaptor module 2 is connected to I/O devices 3-1 and 3-2, which are, for example, disk drives, and the adaptor module 2 controls the I/O devices 3-1 and 3-2 on the basis of on an I/O command from the processor module 1. Likewise, the other adaptor module 2' is connected to I/O devices 3'-1 and 3'-2.

The bus controller 7 in the processor module 1 carries out a data transfer control between the MPU bus 8 and the system bus 4. The bus controller 7 comprises an I/O command retention block 10 for retaining an I/O command issued from the CPU 5, an I/O command control block 12 and an interrupt request block 11. The interrupt request block 11 notifies the CPU 5, by an interrupt, of a failure in activating the I/O device, when the I/O devices in the adaptor modules 2 or 2' are not activated successfully. The I/O command control block 12 receives the data retained in the I/O command retention block 10 as an input and transmits the I/O command to the adaptors modules 2 and 2' via the system bus 4. The I/O command control block 12 makes a determination on the execution result from the adaptor modules 2 and 2', and either becomes ready to be acted on by the I/O command retention block 10 or activates the interrupt request block 11. Specifically, the I/O command control block 12 comprises an I/O command transfer processing block 15 and an activation result determination portion 16. The I/O command transfer processing block 15 converts the I/O command retained in the I/O command retention block 10 into a format suitable for the system bus, and transfers the converted I/O command to the adaptor modules 2 and 2' via the system bus 4. The activation result determination portion 16 determines whether the I/O devices are successfully activated (OK) or not (NOT OK), on the basis of on the activation result information transmitted from the adaptor modules 2 and 2'. When the I/O devices are successfully activated (OK), the I/O command retention block 10 is controlled (reset) to become ready to receive the next command. When the activation of the I/O devices is unsuccessful (NOT OK), the interrupt request block 11 is enabled.

As described above, the bus controller 7 can take one status of the following three: (1) an available status where the I/O command retention block 10 is reset and ready to receive a command input: (2) an interrupt status where the interrupt request block 11 is enabled: (3) a busy status where the bus controller 7 is executing an I/O command and cannot accept another I/O command.

Referring to the flowchart in FIG. 4, a description of an I/O command issuing control process will be given.

An I/O command issuing control process is divided into the processes in a processor module 21, a system bus 22 and an adaptor 23. The processor module 21, the system bus 22 and the adaptor 23 are connected in the same manner as in FIG. 3.

A CPU in the processor module 21 issues an I/O command 24. This I/O command 24 is input into a command selection decoder (not shown in the figure) of the bus controller 7. When a command from the CPU is determined to be an I/O command 24 by the command selection decoder, the I/O command 24 is retained in the I/O command retention block 10 of the bus controller 7. When the CPU is notified that the I/O command 24 is retained in the I/O command retention block 10 by the bus controller, the CPU executes a process 25 of issuing the next command, regardless of whether the activation of the I/O devices resulting from the I/O command 24 was actually successful or not.

On the other hand, the I/O command control block 12 of the bus controller 7 receives the I/O command 24 from the I/O command retention block 10. The I/O command transfer processing block 15 in the I/O command control block 12 executes a process whereby a bus command is generated for transferring the I/O command 24 to the adaptor 23 via the system bus 22. In accordance with this bus command, the I/O command 24 is transferred to the adaptor 23 via the system bus 22. The adaptor 23 activates the I/O device specified by the I/O command 24 thus received. The adaptor 23 returns the activation result information, which shows whether the activation of the I/O devices was successful or not, to the bus controller of the processor module 21 via the system bus 22. The activation result determination block 16, in activation result process 26, determines whether the activation of the I/O devices was successful (OK) or not (NOT OK), on the basis of the activation result information returned from the adaptor 23. When the activation result determination block 16 determines that the activation of the I/O devices was successful (OK), the I/O command retention block 10 will be in a status (an available status) where it is ready to receive the next I/O command (a reset process 27). The bus controller does not report the activation result of the I/O devices to the CPU. That is, the CPU is allowed to continue to carry out a specified task. The bus controller waits for next I/O command to be issued from the CPU. When the activation result determination block 16 determines that the activation of the I/O devices was unsuccessful (NOT OK), the interrupt request block is made effective, the CPU is interrupted, and the bus controller notifies the CPU that the activation of the I/O devices was unsuccessful.

When the next I/O command is input from the CPU while the bus controller 7 is executing a process resulting from an I/O command (a busy status), the I/O command input causes, for example, an error processing sequence specified in the processor module internal bus (MPU bus 8) to be executed, and the CPU is notified that the I/O command was issued while the bus controller was in a busy status. Such a thing can only happen when there is a "bug" in software inside the CPU.

The CPU, when notified by an interrupt from the bus controller 7 of the unsuccessful activation of the I/O devices, executes a specified activation failure process. This activation failure process includes an I/O command reissuing process, a recovery process for recovering from a failure and a process of alerting an operator. The alert process may be executed when a wrong device number was used to specify an I/O unit, or when there is a hardware error in the system bus, for example.

A description of an embodiment of the present invention will be given by referring to FIGS. 5 to 14.

Figure 5:
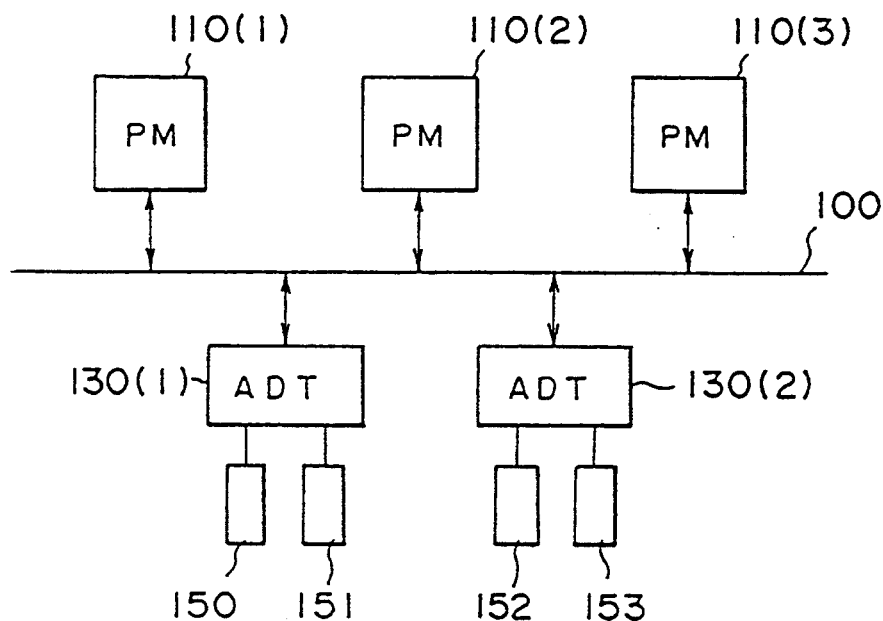
FIG. 5 is a block diagram illustrating a basic configuration of a data processing system.

FIG. 5 illustrates a basic configuration of a data processing system. Referring to FIG. 5, this data processing system comprises a plurality of processor modules 110 (1)–110 (3), and a plurality of adaptor modules 130 (1) and 130 (2). The processor modules 110 (1)–110 (3) and the adaptor modules 130 (1) and 130 (2) are connected to a system bus 110, and each processor modules 110 (1)–110 (3) controls adaptor module 130 (1) and 130 (2) via the system bus 100. The first adaptor module 130 (1) is connected to two I/O devices 150 and 151, which are magnetic disk drives, for example, and the first adaptor module 130 (1) controls the I/O devices 150 and 151 on the basis of an I/O command. The second adaptor module 130 (2) is also connected to two I/O devices 152 and 153, and the second adaptor module 130 (2) controls the I/O devices 152 and 153 on the basis of an I/O command.

Figure 6:
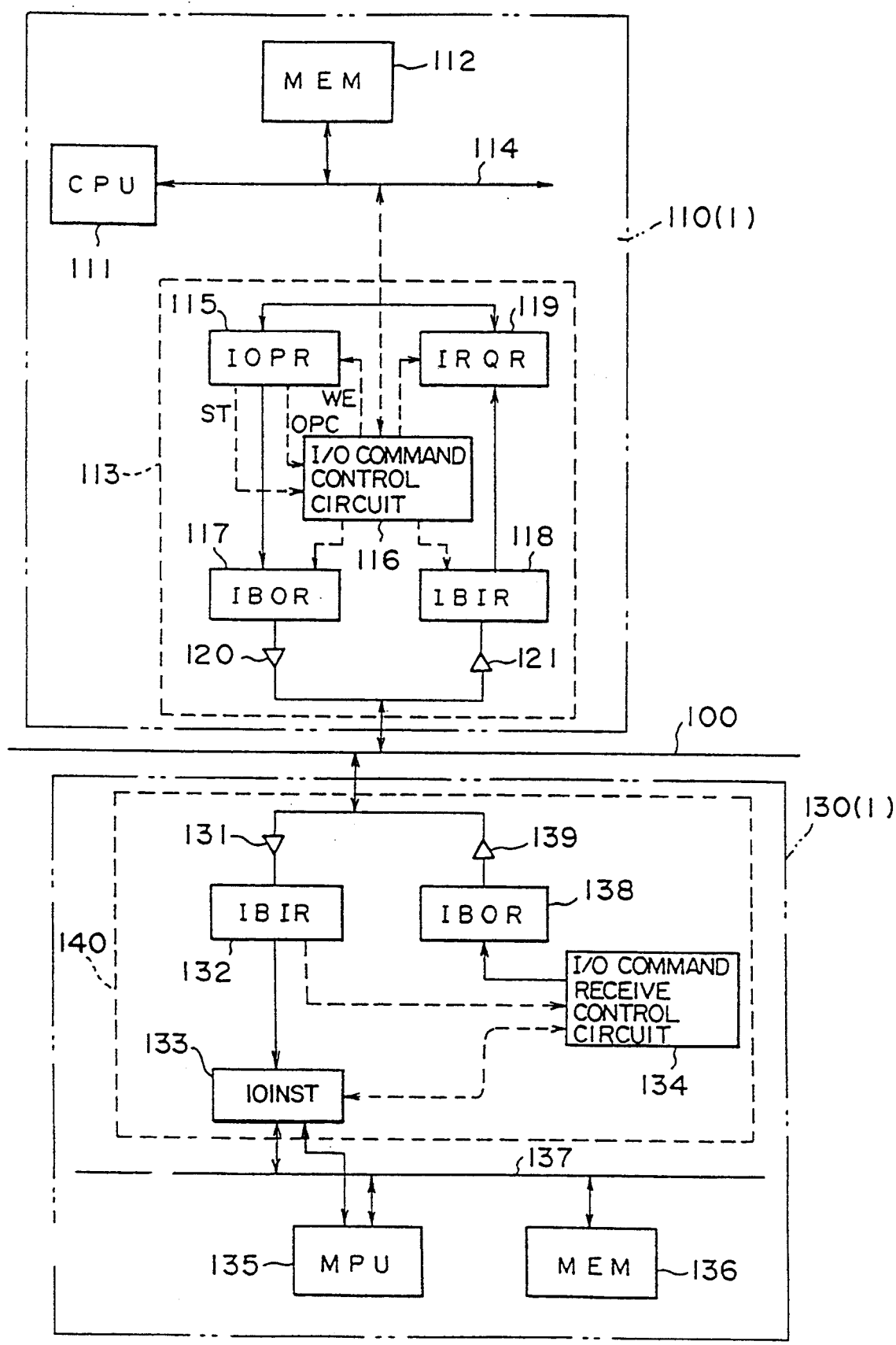
FIG. 6 is a block diagram illustrating a embodiment of a data processing system of the present invention.

The processor modules 110 (1)–110 (3) and adaptor modules 130 (1) and 130 (2) are each configured as shown in FIG. 6. While FIG. 6 shows the first processor module 110 (1) and the first adaptor module 130 (1) only, the other processor modules 110 (2) and 110 (3) and the adaptor module 130 (2) are also configured in the same manner.

The processor module 110 (1) comprises a CPU 111, a memory (MEM) 112 and a bus controller 113, which are connected by a PM internal bus 114. The bus controller 113 comprises an I/O command register 115 (IOPR), an output register 117 (IBOR), an input register (IBIR) 118, an interrupt request register (IRQR) 119 and an I/O command control circuit 116. The I/O command control circuit 116 executes a process on an I/O command issued from the CPU 111. The I/O command register 115 (IOPR), the output register 117 (IBOR), the input register (IBIR) 118 and the interrupt request register (IRQR) 119 are controlled by the I/O command control circuit 116. The I/O command register (IOPR) 115 is used in order to store an I/O command from the CPU 111, and the I/O command stored in the I/O command register (IOPR) 115 is supplied to a system bus 100 via the output register (IBOR) 117 and a transmitter 120. Execution result information from the adaptor module 130 (1) on the system bus 100 is entered into the input register (IBIR) 118 via a receiver 121. Interrupt request information is set in the interrupt request register (IRQR) 119, on the basis of the information in the input register (IBIR) 118.

The adaptor module 130 (1) comprises an MPU 135, a memory (MEM) 136 and a bus controller 140, which are connected by an adaptor internal bus 137. The bus controller 140 comprises an input register (IBIR) 132, an I/O command receive register (IOINST) 133, an output register (IBOR) 138 and an I/O command receive control circuit 134. The I/O command receive control circuit 134 executes a process in response to an I/O command supplied from the processor module 110 (1) via the system bus 100. The input register (IBIR) 132, the I/O command receive register (IOINST) 133 and the output register 138 (IBOR) are controlled by the I/O command receive control circuit 134. The I/O command receive register 133 (IOINST) is used for storing an I/O command carried on the system bus via a receiver 131 and the input register 132 (IBIR), and the I/O command stored in the I/O command receive register (IOINST) 133 is supplied to the MPU 135 via the adaptor internal bus 137. The MPU 135 controls the I/O device 150 or 151, on the basis of the I/O command supplied. The I/O command receive control circuit 134 outputs a response signal (information about the activation result) to the system bus 100 via the output register (IBOR) 138 and a transmitter 139.

Figure 7:
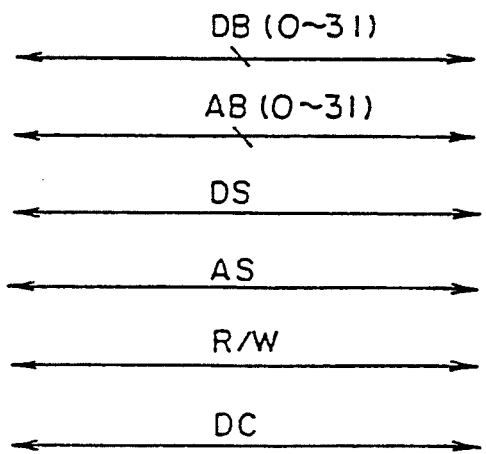
FIG. 7 is a diagram illustrating a configuration of an internal bus of a processor module and an adaptor module in FIG. 6.

The PM internal bus 114 inside the processor module 110 (1) and the adaptor internal bus 137 inside the adaptor module 130 (1) are configured as shown in FIG. 7. Each bus comprises a 32-bit data bus (DB), a 32-bit address bus (AB), a 1-bit data strobe line (DS), a 1-bit address strobe line (AS), a 1-bit read/write line (R/W) and a 1-bit data completion line (DC). The CPU 111 transfers an I/O command to the bus controller 113 via the data bus (DB) and the address bus (AB). That is, the CPU transfers the I/O command to the bus controller 113 by employing a memory-mapped I/O method. A response signal which represents a normal completion of a bus operation is transferred to the CPU 111 via the data completion line (DC). The CPU detects an error when it does not receive this response signal within a specified time. The I/O command output from the CPU 111 has a format illustrated in FIGS. 8A and 8B, for example. FIG. 8A represents an address (32 bit) and the most significant byte (bits 0–7) in the address indicates whether it is an I/O command or not. When the most significant byte is X'FF' (in hexadecimal) for example, it is an I/O command. The address further contains an adaptor number (ADP) for specifying an adaptor module and an I/O device to be accessed, a device number (DVC) and an operation code (OPC) that tells what kind of I/O command it is. FIG. 8B represents data (32 bit) and this data shows a parameter of an I/O command (a head number of the magnetic disk drive, a seek number etc.).

The I/O command register (IOPR) 115 is configured as shown in FIG. 9, in accordance with the above I/O command. That is, the I/O command register (IOPR)

115 comprises the first portion 115b for storing the adaptor number (ADP), the second portion 115c for storing the device number (DVC), the third portion 115d for storing the operation code (OPC) and the fourth portion 115e for storing the parameter. The first through third portions 115b, 115c and 115d described above are connected across the address bus (AB) and the output register (IBOR) 117, and the fourth portion 115e described above is connected across the data bus (DB) and the output register (IBOR) 117. Further, this I/O command register (IOPR) 115 is provided with a status bit (ST) 115a. When the status bit (ST) 115a is "0", it shows that the I/O command register (IOPR) 115 is ready to fetch an I/O command. When the status bit (ST) 115a is "1", it shows that the I/O command register (IOPR) 115 is busy. Into the first through fourth portions of the above I/O command register (IOPR) 115 is fetched information carried on the address bus (AB) and the data bus (DB), by a write enable signal from the I/O command control circuit 116. The status bit (ST) 115a is either set to "1" or reset to "0" by the I/O command control circuit 116.

The CPU can read all the bits in the I/O command register (IORP) 115. For example, by specifying the address X'FF000000', the status bit (ST) 115a and the first through third portions (ADP, DVC and OPC) 115b–115d are read, and by specifying the address X'FF000004', the parameter is read.

The I/O command control circuit 116 generates an I/O command bus command by adding a processor number (PM) for specifying the processor module 110 (1), to the I/O command stored in the I/O command register (IOPR) 115. The format for this I/O command command is organized in such a way that it contains the first word (32 bit) consisting of the processor number (PM), an adaptor number (ADP), a device number (DVC) and an operation code (OPC), and the second word (32 bit) consisting of the I/O command parameter. The system bus 100 includes, as shown in FIG. 12, a 32-bit data bus (DB), a 3-bit bus (TB) and a 2-bit response line (RLN). The bus (TB) specifies the kind of data on the data bus (DB), and a 3-bit data on the bus (TB) has the following meanings, for example.

000: Invalid data 100: I/O command command
   001: Data transfer command 101: I/O command data
   010: Data transfer address 110: I/O interrupt command
   011: Data transfer data 111: I/O interrupt data The I/O command bus command described above is transferred, as shown in FIG. 11, from the processor module 110 (1) to the adaptor module 130 (1) one word at a time via the data bus (DB). At this time, the 3-bit data is also transferred from the processor module 110 (1) to the adaptor module 130 (1) via the bus (TB). When the first word (word 0) shown in FIG. 11 is transferred, the 3-bit data "100" representing the I/O command is transferred on the bus (TB). When the second word (word 1) is transferred, the 3-bit data "101" representing the I/O command data is transferred on the bus (TB). The adaptor module 130 (1) determines the kind of I/O command bus command on the data bus (DB), on the basis of the 3-bit data on the bus (TB).

The I/O command receive register (IOINST) 133 in the adaptor module 130 (1) is configured as shown in FIG. 10. That is, the I/O command receive register (IOINST) 133 comprises a first portion 133b for storing the processor number (PM), a second portion 133c for storing the device number (DVC), a third portion 133d for storing the operation code (OPC) and a fourth portion 133e for storing the parameter. The I/O command receive register 133 further comprises an interrupt bit (V) 133a. When the I/O command bus command of a format such as the one shown in FIG. 11 is set in the input register (IBIR) 132, the processor number (PM), the device number (DVC), the operation code (OPC) and the parameter, which are in the bus command, are stored in corresponding regions in the I/O command receive register (IOINST) 133. The I/O command control circuit 134 sets the interrupt bit (V) to "1", when the adaptor module 130 (1) can respond normally to an I/O command from the processor module 110 (1). When the interrupt bit (V) is set to "1", an interrupt request is made to the MPU 135. The MPU 135 acts on this interrupt request by fetching the data in the I/O command receive register (IOINST) 133 via the adaptor internal bus 137, and recognizes the I/O command issued from the processor module 110 (1). The MPU 135 executes a process (an activation of the I/O device, for example) resulting from this I/O command. The MPU 135 resets the interrupt bit (V) described above to "0" when the process resulting from the I/O command is completed.

On the other hand, the I/O command receive control circuit 134 monitors the status of the adaptor module 130 (1). When the I/O command bus command is input, the I/O command receive control circuit 134 returns a response signal in accordance with the status of the adaptor module 130 (1) to the processor module 110 (1). This response signal is supplied from the adaptor module 130 (1) to the processor module 110 (1) via a 2-bit response line (RLN) shown in FIG. 12. The 2-bit data (response signal) on the response line (RLN) represents the status of the adaptor module 130 (1) such as described below.

00: the status in which there is no adaptor module corresponding to the adaptor number.
   01: the status in which a normal response is possible
   10: the status in which the I/O command receive register (IOINST) 133 is busy (the I/O command receive register (IOINST) 133 is used by a previous bus command)
   11: the status in which the adaptor is not ready (not operable due to a failure or an initialization immediately following a reset)

The adaptor module 130 (1) outputs a response signal "01" to the response line (RLN) when the I/O device specified by the bus command can be activated, and outputs a response signal "00", "10" or "11" to the response line (RLN) when the I/O device cannot be activated.

Figure 13:
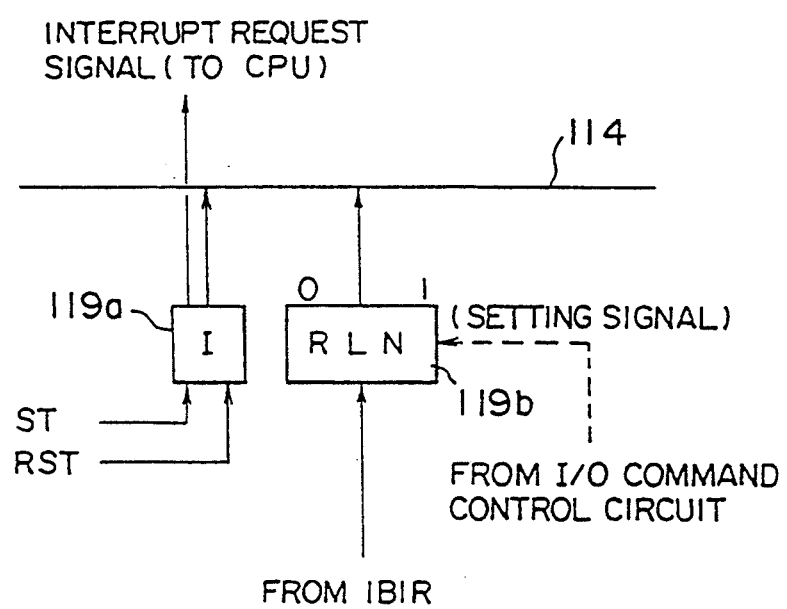
FIG. 13 is a diagram illustrating a configuration of an IRQR register of FIG. 6.

The interrupt request register (IRQR) 119 in the bus controller 113 of the processor module 110 (1) is configured as shown in FIG. 13. That is, the interrupt request register (IRQR) 119 comprises an interrupt request bit (I) 119a, a response line (RLN), a response signal portion 119b for storing a response signal (2 bit) supplied via the input register (IBIR) 118. The interrupt request bit (I) 119a is set to "1" by the I/O command control circuit 116. When the interrupt request bit (I) 119a is set to "1", an interrupt request is made to the CPU 111, and the response signal set in the response signal portion 119b is entered into the CPU 111 via the PM internal bus 114. The CPU 111 executes a specified process in accordance with the response signal entered thereto.

An I/O command issued from the processor module 110 (1) includes an activation type I/O command category and a completion type I/O command category. These commands are identified by the operation code (OPC). The operation codes (OPC) of 00–7F represent activation type I/O commands, and the other operation codes (OPC) represent completion type I/O commands. With the activation type I/O commands, the adaptor module actually executes a data I/O process on an I/O device such as a disk drive, resulting from the I/O command. With the completion type I/O commands, a process is complete immediately after the I/O command is issued to the adaptor module. For example, a command for resetting the adaptor module belongs to the completion type I/O command category.

An issuing control of an I/O command is performed by the following procedure, for example.

The CPU, before issuing an I/O command, determines whether the status bit (ST) of the I/O command register (IOPR) 115 is "0" or not, by such means as a command for reading an address X'FF000000'. When the status bit (ST) "0" is detected, the CPU 111 outputs a write command for writing to the address X'FFXXXXXX', which corresponds to the I/O command, to the PM internal bus 114. After thus issuing the I/O command, the CPU 111 then executes other processes sequentially regardless of the result of the I/O command.

Figure 14:
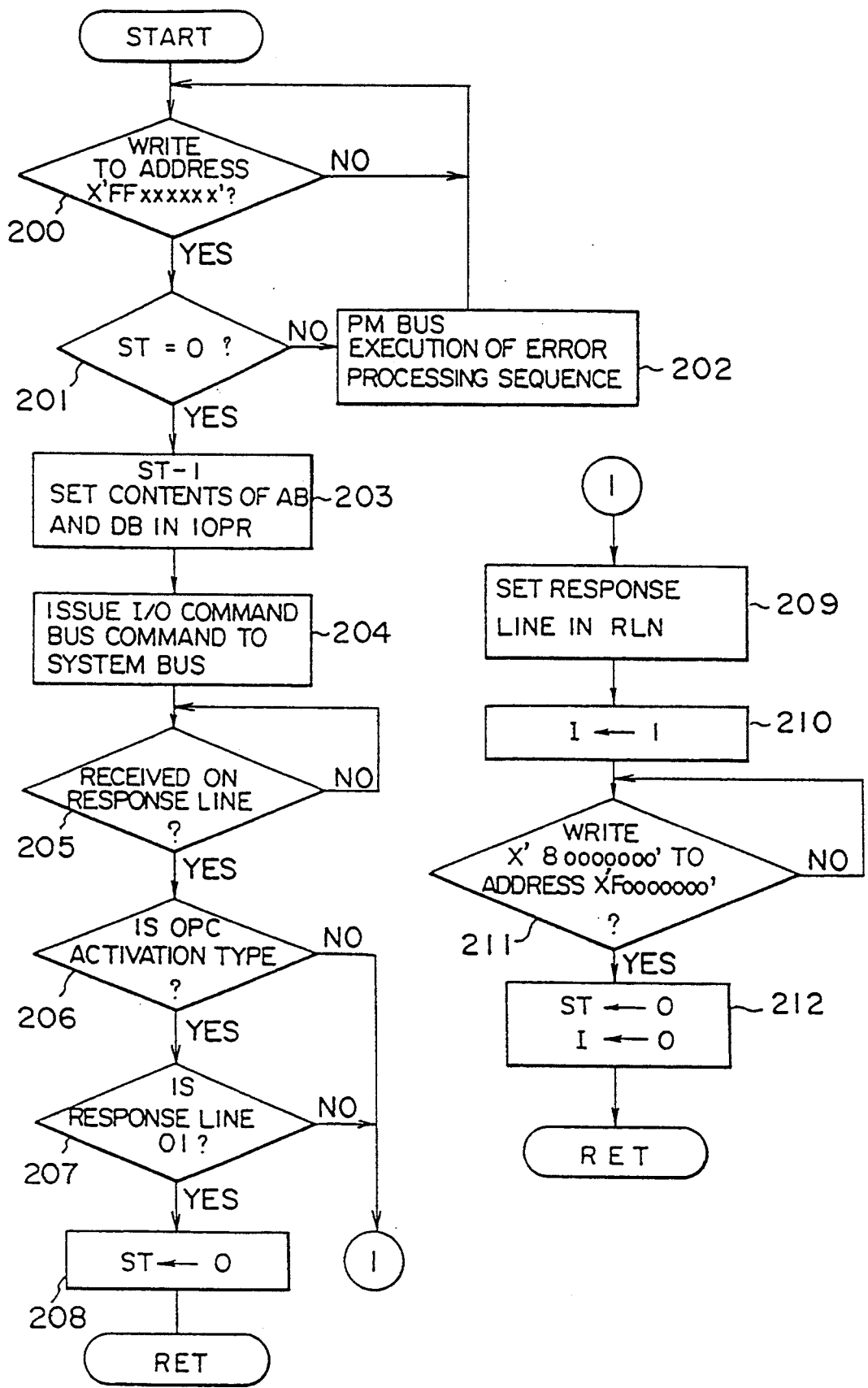
FIG. 14 is a flowchart illustrating a example of an I/O command issuing process.

The I/O command control circuit 116 executes a process according to a flowchart of FIG. 14.

The I/O command control circuit 116 monitors the PM internal bus 114. When step 200 detects a write command issued from the CPU 111 for writing on the address X'FFXXXXXX', the I/O command control circuit 116 recognizes that the I/O command was issued from the CPU 111. When step 201 determines the status bit (ST) to be "0", step 203 allows the I/O command control circuit 116 to output a write enable signal (WE), with the result that the data (the adaptor number (ADP), the device number (DVC), the operation code (OPC) and the parameter) which are output from the CPU 111 and are carried on the address bus (AB; bits 8–31) and the data bus (DB; bits 0–31), are set in the I/O command register 115 (IOPR). That is, the I/O command issued from the CPU is set in the I/O command register 115 (IOPR). Step 203 also sets the status bit (ST) of the I/O command register 115 (IOPR) to "1". The step 204 generates an I/O command bus command on the basis of the I/O command set in the I/O command register 115 (IOPR), and outputs the generated bus command to the system bus 100. When the adaptor module specified by the I/O command bus command receives this I/O bus command, the adaptor module returns a response signal in accordance with the status of the adaptor module, to the processor module via the response line (RLN). The I/O command control circuit 116, after step 204, monitors the response line (RLN) in step 205. When step 205 detects the response signal returned from the adaptor module and carried on the response line (RLN), step 206 determines whether the I/O command is of an activation type or not, and step 207 determines whether the response signal on the response line (RLN) is "01" indicative of normal status, or not. When the I/O command is found to be of an activation type and the response signal is found to be "01", the I/O command control circuit 116 determines that the I/O device specified by the I/O command has been activated.

Step 208 resets the status bit (ST) of the I/O command register (IOPR) 115 to "0", making the processor module ready to issue next I/O command.

On the other hand, when step 206 determines that the I/O command is of a completion type, or step 207 determines that the response signal on the response line (RLN) is not "01", the process goes on to step 209. For example, when step 206 determines that the I/O command is not of an activation type, and step 206 determines that the response signal is not "01", the I/O command control circuit 116 recognizes that the I/O device activation resulting from the I/O command was unsuccessful. Step 209 sets the response signal (2 bit) on the response line (RLN) in the interrupt request register 119, and sets the interrupt request bit (I) 119a to "1". When the interrupt request bit (I) 119a Is set to "1", an interrupt request is made to the CPU 111. The interrupted CPU performs the aforementioned activation failure process in accordance with the response signal set in the interrupt request register 119, in a specifically timed manner. Then the CPU, in order to reset the interrupt request bit (I) 119a to "0", outputs a write command for writing a data X'80000000' on an address X'F0000000' corresponding to the reset command, to the PM internal bus 114. In the I/O command control circuit 116, when step 211 detects the command for writing the data '80000000' on the address X'F0000000', step 212 resets the status bit (ST) of the I/O command register 115 (IOPR) and the interrupt request bit (I) 119a of the interrupt request register 119 to "0". When step 212 is completed, the I/O command control circuit 116 returns to an initial status.

When step 201 determines that the status bit (ST) is not "0"step 202 determines that the PM internal bus 114 has failed and performs a specified error processing sequence.

POSSIBLE APPLICATION IN THE INDUSTRY

As described above, the present invention allows the processing unit of the first module to execute another process after issuing an I/O command. When a process being as a result of the I/O command and carried out in the second module was not successful, the execution result in the second module is supplied to the processing unit, by means of an interrupt. This improves an efficiency of the processing unit and improves a processing efficiency of a data processing system.

The present invention is not limited to the above embodiment but various variations and modifications may be made without departing from the scope of the present invention.

We claim:

1. An I/O command issuing control system comprising:
   a system bus;
   a first module connected to the system bus; and
   a second module connected to an input/output device and to the system bus so that the first module and the second module are connected together through the system bus, the first module issuing an I/O command which implements a corresponding process in the second module to thereby control the input/output device and the second module producing a processing result indicating whether the process corresponding to the I/O command was successfully implemented or was not successfully implemented and outputting a corresponding result signal;

the first module further comprising:
- a processing unit that issues the I/O command and carries out a separate process after issuing the I/O command,
- I/O command retaining means for receiving and retaining the I/O command issued from the processing unit,
- transferring means for transferring, to the system bus, an I/O command retained in the I/O command retaining means,
- examining means for receiving the result signal from the second module and determining whether the process corresponding to the I/O command was successfully implemented or not successfully implemented in the second module, and
- interrupt request means for creating, when the examining means determines that the I/O command was not successfully implemented in the second module, an interrupt signal which indicates the processing result and providing the interrupt signal to the processing unit while the processing unit is carrying out the separate process; and the second module further comprising:
- response means for providing the result signal to the first module via the system bus.

2. An I/O command issuing control system as in claim 1, wherein a first and a second type of data can be stored in the I/O command retaining means, the I/O command retaining means has a first state in which the I/O command retaining means can receive an I/O command and a second state in which the I/O command retaining means cannot receive an I/O command and includes data retaining means for retaining the first type of data when the I/O command retaining means is in the first state and retaining the second type of data when the I/O command retaining means is in the second state, and
- the processing unit issues an I/O command when the first type of data is retained in the determination data retaining means.

3. An I/O command issuing control system as in claim 2, further comprising first means for retaining the first type of data in the data retaining means when the examining means has determined that a process was successfully implemented in the second module, and second means for retaining the second type of data in the data retaining means when an I/O command is retained in the I/O command retaining means.

4. An I/O command issuing control system as in claim 2, wherein the processing unit carries out an interrupt process upon receipt of an interrupt signal from the interrupt request means, the I/O command issuing control system further comprising first means for retaining the first type of data in the data retaining means after the processing unit has carried out an interrupt process, and second means for retaining the second type of data in the data retaining means when an I/O command is retained in the I/O command retaining means.

5. An I/O command issuing control system as in claim 1, wherein the transferring means comprises bus command generation means for generating a bus formatted I/O command corresponding to an I/O command retained by the I/O command retaining means, the bus formatted I/O command being formatted so as to be transferrable on the system bus and is supplied to the second module via the system bus.

6. An I/O command issuing control system as in claim 1, wherein the system bus comprises a predetermined number of response lines, process result information bits express the processing result of the process in the second module and are provided by the response means, there being one respective process result information bit corresponding to each response line, and the response means comprises response transferring means for transferring the process result information bits from the response means to the first module via at least one of the response lines.

7. An I/O command issuing control system as in claim 1, wherein interrupt request information allows the processing unit to carry out an interrupt process upon receipt of an interrupt signal from the interrupt request means and the interrupt request means comprises:
- first storing means for storing the process result indicated by the response signal; and
- second storing means for storing interrupt request information when the examining means determines that a process corresponding to an I/O command was not successfully implemented in the second module, and
- the interrupt request means provides an interrupt request to the processing unit when the interrupt request information is stored in the second storing means.

8. An I/O command issuing control system as in claim 6, wherein interrupt request information bits represent interrupt request information and the interrupt request means comprises:
- a first register for storing the process result information bits transferred via the response transferring means; and
- a second register for storing the interrupt request information bits when the examining means determines that the process was not successfully implemented in the second module, and
- the interrupt request means provides an interrupt request to the processing unit when the interrupt request information bits are stored in the second register.

9. An I/O command issuing control system as in claim 1, wherein an I/O command comprises:
- first information for specifying the second module;
- second information for specifying an I/O device controlled by the second module; and
- third information for specifying a control parameter for the I/O device specified by the second information.

10. An I/O command issuing control system as in claim 9, wherein the I/O command retaining means comprises:
- a first region in which the first information is stored;
- a second region in which the second information is stored, and
- a third region in which the third information is stored.

11. A method of controlling a computer system having a system bus, a first module connected to the system bus, and a second module connected to and controlling an input/output device and connected to the system bus so that the first module and the second module are connected together through the system bus, the method comprising:
- issuing, by the first module to the second module, an I/O command which implements a corresponding process in the second module to thereby control the input/output device;

performing a separate process by the first module after the I/O command is issued by the first module to the second module;

receiving, by the second module, the I/O command and initiating the process corresponding to the I/O command;

providing a result signal to the first module from the second module indicating a processing result of whether the process corresponding to the I/O command was successfully implemented or was not successfully implemented in the second module;

receiving the result signal by the first module; and interrupting the first module while the first module is performing the separate process if the I/O command was not successfully implemented in the second module.

* * * * *

UNITED STATES PATENT AND TRADEMARK OFFICE
CERTIFICATE OF CORRECTION

PATENT NO. : 5,363,488
DATED : November 8, 1994
INVENTOR(S) : Yuji HIDAKA, et al.

Page 1 of 2

It is certified that error appears in the above-indentified patent and that said Letters Patent is hereby corrected as shown below:

Col. 1, line 16, change "30" to --40--; and
    Line 20, after "and", first occurrence, insert --42'--.
Col. 2, line 63, change "When" to --when--.
Col. 3, line 13, change "processin" to --process in--; and
    Line 65, change "adaptors" to --adaptor--.
Col. 4, line 23, change ":" to --;--; and
    Line 24, change ":" to --; and--.
Col. 5, line 40, change "110" to --100--; and
    Line 40, change "modules" to --module--.
Col. 7, lines 44-48, the numbers "100:", "101:", "110:" and "111:", respectively, should be aligned with one another.
Col. 10, line 16, change "Is" to --is--; and
    Line 42, delete "as".
Col. 11, lines 4, 7, 10, 15 and 38, change the "," at the end of each line to a --;--.

UNITED STATES PATENT AND TRADEMARK OFFICE
CERTIFICATE OF CORRECTION

PATENT NO. : 5,363,488
DATED : November 8, 1994
INVENTOR(S) : Yuji Hidaka, et al It is certified that error appears in the above-indentified patent and that said Letters Patent is hereby corrected as shown below:

Column 12, line 19, delete "and ";
          lines 24, 39 and 57, change ",", each occurrence, to --; --; and
          line 35, delete "and", Signed and Sealed this Tenth Day of January, 1995

BRUCE LEHMAN

*Attest:*

*Attesting Officer*     *Commissioner of Patents and Trademarks*